Sept. 5, 1967     A. C. KRACKLAUER     3,339,742
SPACED WALL FILTER ELEMENT HAVING ASSEMBLING MEANS
Filed June 17, 1964
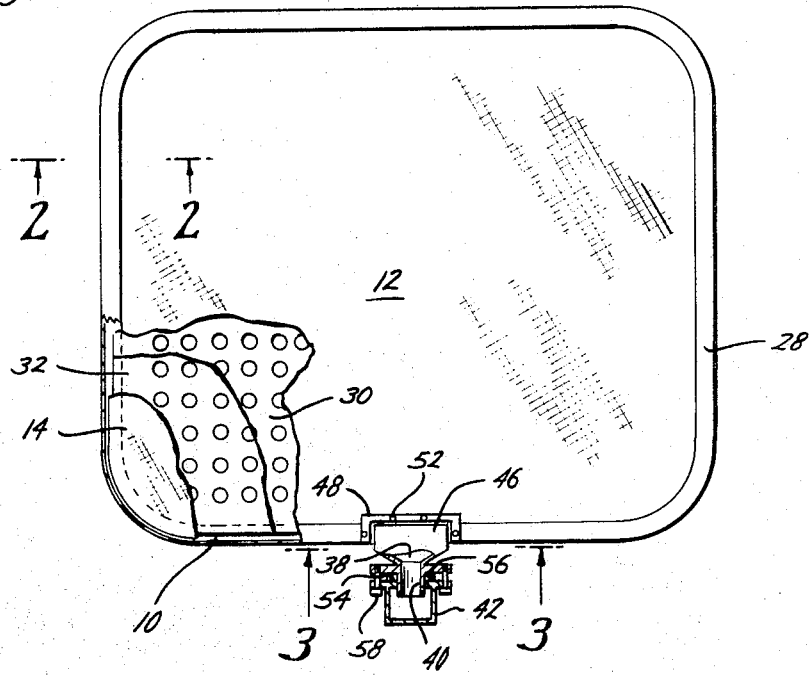
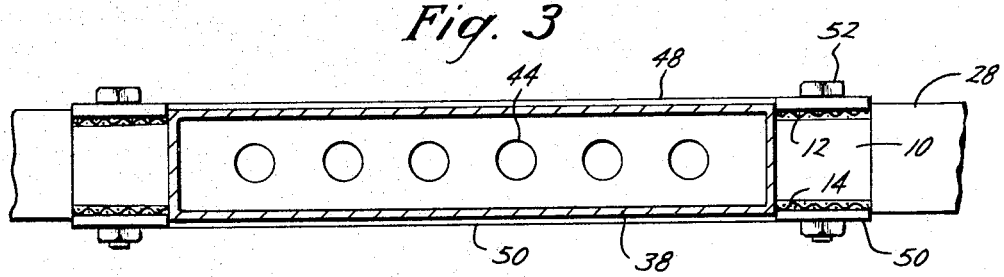
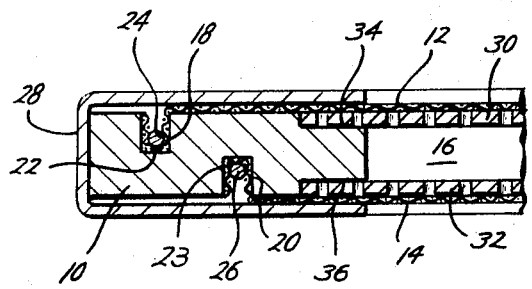
Aloysius C. Kracklauer
INVENTOR.
BY Arnold and Roylance
ATTORNEYS

United States Patent Office 3,339,742
Patented Sept. 5, 1967

3,339,742
SPACED WALL FILTER ELEMENT HAVING
ASSEMBLING MEANS
Aloysius C. Kracklauer, Conroe, Tex., assignor to
Sparkler Mfg. Company, Montgomery County,
Tex., a corporation of Illinois
Filed June 17, 1964, Ser. No. 375,740
8 Claims. (Cl. 210—232)

The invention concerns apparatus which may be employed in the filtering of fluids to remove suspended matter therefrom, and particularly concerns filter plate constructions and improvements in filter plate constructions.

Industrial filtering apparatus commonly comprise a vessel having a plurality of filter plates therein which filter the fluid as it passes through filtering means associated with each plate, and inlet and outlet means for introducing the fluid to the plates and removing the fluid from the vessel after it passes through the filtering means. One common construction which has wide applicability employs a plurality of spaced filter plates, each comprising two spaced parallel filtering means, a connecting member between the spaced filtering means near their periphery to close the plate and prevent fluid flow to the interior of the plate in a path other than through a filtering means, and an outlet communicating with the interior of the plate to permit fluid in the interior of the plate, which has been filtered by the filtering means, to flow from the plate into a manifold or the like. The filtered fluid or filtrate can then pass out of the manifold and thus out of the filtering apparatus without mixing with the incoming unfiltered fluid. The filtering means associated with each plate can comprise, for example, metal screen, woven cloth, a bed of granular material, any number or combination of these, or any other means for filtering suspended matter from the fluid.

The invention is directed to novel constructions of filter plates and various improvements therein. In general, filter plates constructed in accordance with the invention admit of easy assembly and disassembly and are amenable to convenient repair as well as replacement of worn parts. For example, commercial filter plates for industrial use usually employ metal screen as a filtering means, and the metal screen is usually welded to a frame which acts as a support and also as a barrier to the entry of suspended matter into the interior of the plate. Since the metal screen is in general the first part of the plate which requires repair or replacement, welding is frequently an undesirable way to mount the metal screen on the frame. The invention provides techniques as well as means for mounting a metal screen or other filtering means on a frame, to effect both a strong structure and the prevention of entry of solids into the interior of the plate, without the usual need for welding.

One embodiment exemplifying a filter plate in accordance with the invention, which is amenable to easy assembly and disassembly, comprises a frame having a pair of grooves oppositely disposed in its laterally opposite faces; a pair of filtering means each disposed against one of said faces to effect an interior space into which filtrate can flow, a portion of each of the filtering means fitting into one of the grooves; a pair of splines each fitting over one of the filtering means and into one of the grooves substantially tightly, and a substantially U-shaped member disposed over the frame with the legs thereof fitting over the laterally opposite faces with the splines and the filtering means being between the legs and the frame.

In another aspect of the invention, a filtrate outlet means is provided on a frame in such a manner that there is no need for welding a filtering means to the frame around the outlet means to prevent entry of solids into the interior of the plate. This improvement comprises, for example, mounting the filtrate outlet means over at least one radial hole in the frame, the outlet means comprising a header having portions which overlap the laterally opposite faces of the frame and a nozzle associated with the header which is suitable for connection with a manifold, and then binding the filter means near the overlapping portions of the header in against the frame by a clamping means, such as a bar which is shaped to fit against the filtering means around the overlapping portion of the header and which is bolted against the filtering means, thereby binding the filtering means against the frame.

Other novel aspects of the invention and concomitant advantages will be apparent from the following description including reference to the drawings wherein:

FIG. 1 is an elevational view, partially in section and partially broken away, of an embodiment of a filter plate constructed in accordance with the invention;

FIG. 2 is a fragmentary sectional view taken along the line 2—2 in FIG. 1; and

FIG. 3 is an enlarged fragmentary sectional view taken along the line 3—3 in FIG. 1.

With reference to the drawings, the filter plate there shown comprises a frame 10 of generally rectangular shape with arcuate corners and a metal screen 12 mounted on the frame 10 such that in combination with an oppositely disposed metal screen 14 an interior space 16 is defined within the plate. Of course, the frame 10 may be of a circular shape, a triangular shape, or any other suitable shape, and the invention is not limited to the shape of the frame 10. In general, therefore, the frame 10 may be referred to as annular or ringlike in character in the sense that it completes a circuit.

The frame 10 has a pair of grooves 18 and 20 oppositely disposed on laterally opposite faces of the frame 10. The grooves 18 and 20 preferably extend substantially completely around the frame 10 along its longitudinal axis and are preferably disposed in a staggered relationship on opposite faces of the frame 10 in order to maintain strength in the frame 10, while keeping it thin. An end portion 22 of the metal screen 12 and an end portion 23 of the metal screen 14 fit in the respective grooves 18 and 20 and are held in place in the grooves 18 and 20 by splines 24 and 26 which preferably extend around the frame 10 the length of the grooves 18 and 20, and which hold the metal screens 12 and 14 in substantially tight engagement with the frame 10. The splines 24 and 26 are preferably made of flexible metal cable, but may be made of any suitable materials.

A U-shaped channel member 28 fits over the frame 10 as well as the ends of the metal screens 12 and 14 and keeps the splines 24 and 26 in place in substantially tight engagement with the end portions 22 and 23 of the metal screens 12 and 14.

Preferably the U-shaped channel member 28 also holds supporting plates 30 and 32 in place in recesses 34 and 36 made in the edges of the inner face of the frame 10. The recesses 34 and 36 are preferably shaped as shown to permit the supporting plates 30 and 32 to contact directly and support the filter screens 12 and 14. The channel member 28 preferably extends around the frame 10 substantially the length of the grooves 18 and 20.

Thus, it may be seen that the filter plate described above is securely constructed without need for welding any portions together and consequently is amenable to easy assembly and disassembly as well as convenient replacement of the filter screen.

Although the above construction is not limited to any particular construction of filtrate outlet means for the filter plate, as long as the outlet means does not permit solids to enter the interior of the plate freely, the following construction of a filtrate outlet means is preferred. With reference to FIG. 1 and FIG. 3, the filtrate outlet means comprises a shroud or header 38 with a nozzle 40 attached thereto and suitable for connection with an outlet manifold 42. The outlet nozzle 40 may be welded to the header 38 if one so desires. The header 38 is mounted over at least one radial hole 44 in the frame 10, preferably a plurality of holes to permit rapid flow of the filtrate from the interior of the plate. The header 38 has an overlapping portion 46 over a portion of the frame 10 on one lateral face of the frame 10 as well as a similar overlapping portion on the opposite face, and the header 38 may be welded to the frame 10 along all the resultant abutting edges, or it may be bolted thereto as long as a seal is maintained between the header 38 and the frame 10.

In the preferred construction shown, the filter screens 12 and 14 abut against the edges of the overlapping portions of the header 38, and the screens 12 and 14 are held against the frame 10 near the overlapping portions by a clamping means to prevent free or substantial entry of solids into the interior of the plate. Preferably, a bar 48 is disposed over the frame 10 against the screen 12 and is bolted in place, thereby binding the screen 12 against the frame 10. Of course, a similar construction, including a bar 50, is employed on the opposite face of the frame 10 to hold the screen 14 in place against the frame 10.

The bar 48 as shown is shape dto fit around and generally conform to the edges of the overlapping portions of the header 38. Bolt holes are provided in the bars 48 and 50 and correspondingly in the frame 10 to permit holes 52 to extend through the holes and bind the filter screens 12 and 14 against the frame 10. Of course, one or more bolts may be employed as needed.

The bars 48 and 50 are preferably shaped relative to the overlapping portions of the header 38 and any means for holding the filter screens on the frame, such as the member 28, sufficiently to prevent free passage of solids into the interior space of the plate when held tightly thereon. Additionally, the bars 48 and 50 should be shaped relative to the channel member 28 such that free passage of solids is prevented in this joint also. In this regard, the grooves 18 and 20 and the splines 24 and 26 preferably extend around the frame 10 for a distance sufficient to permit fitting under the bars 48 and 50. The channel member 28 preferably extends around the frame 10 only from points beginning at the outer edges of the bars 48 and 50. The bars 48 and 50, however, may be constructed with suitable extensions on their under sides to permit their ends to be placed over the channel member 28, or the bars may be placed merely in back of it. Thus, the channel member, the splines, and the grooves may extend to an abutting relationship with the overlapping portions of the header 38. Further, it will be seen that the U-shaped member 28 for easy assembly and disassembly should be discontinuous at some place as shown and should be sufficiently flexible to permit assembly and disassembly. The member 28 may be riveted or bolted on the frame if this is necessary to keep it in place during vibrating periods and the like.

Although the nozzle 40 may take any shape suitable for connection to a manifold, the nozzle 40 preferably includes a substantially flat area 54 around the extending portion of the nozzle and a substantially flat gasket 56 on the flat area 54 to permit sealing engagement with a manifold, such as the manifold 42. The nozzle 40 also preferably includes means associated therewith for permitting bolting to the manifold 42, such as by bolts 58 passing through bolt holes in flanges associated with the nozzle 40 and the manifold 42. This and similar constructions provide a positive seal between the nozzle 40 and the manifold 42, and permit use of a flat gasket made of any suitable material, even metal, although O-rings and the like may be employed in the construction.

may be employed to make similar constructions of filter plates with similar advantages. For example, filtering means other than metal screen may be employed as long as the filtering means may be bound against the frame without harming the filtering means. Similarly, two long bars bolted on the frame may take the place of the U-shaped channel member.

The metal parts referred to above may be made of any suitable materials and in general may be made of, for example, mild steel. The metal screen is frequently made of stainless steel.

What is claimed is:

1. A filter plate amenable to easy assembly and disassembly, said filter plate comprising a frame having at least one radial hole therein with a filtrate outlet means mounted on said frame over said hole, said outlet means comprising a header having portions overlapping the laterally opposite faces of said frame and a nozzle on said header suitable for connection with an outlet manifold, said frame having a pair of grooves oppositely disposed in its laterally opposite faces and extending substantially completely from near one side of said overlapping portions of said header around said frame to near the other side of said overlapping portions; a pair of filtering means each disposed against one of said faces to effect an interior space into which filtrate can flow; a portion of each of said filtering means fitting into one of said grooves; a pair of splines each fitting over one of said filtering means and into one of said grooves substantially tightly for substantially the total length of said grooves; a substantially U-shaped member disposed over said frame and extending from near one side of said overlapping portions around said frame to near the other side of said overlapping portions, with the legs thereof fitting over said filtering means, said splines, and said laterally opposite faces; and means for releasably clamping said filtering means near said overlapping portions sufficiently to prevent free passage of solids into said interior space.

2. The filter plate defined in claim 1 wherein said means for releasably clamping comprises a pair of bars shaped to fit against the filtering means around the overlapping portions of said header and to be bolted in place to bind said filtering means against said frame.

3. The filter plate defined in claim 1 wherein said frame has at least one bolt hole near said overlapping portions of said header, and said means for releasably clamping comprises a pair of bars disposed over laterally opposite faces of said frame over said filtering means, said bars being of a shape relative to said overlapping portions and said U-shaped member sufficient to prevent free passage of solids into said interior space when held tightly thereon, and at least one bolt passing through said bars and said bolt hole and binding said bars in place.

4. A filter plate amenable to easy assembly and disassembly, said filter plate comprising a frame having at least one radial hole therein with a filtrate outlet means mounted on said frame over said hole, said outlet means comprising a header having portions overlapping laterally opposite faces of said frame and a nozzle on said header suitable for connection with an outlet manifold, said frame having a pair of grooves oppositely disposed in its laterally opposite faces and extending substantially from near one side of said overlapping portions of said header around said frame to near the other side of said overlapping portions, and said frame having a pair of recesses each disposed along an edge of the inner face of said frame; a pair of perforated supporting plates fitting in said pair of recesses; a pair of filtering means each disposed over one of said supporting plates and against one of said laterally opposite faces to effect an interior space into which filtrate can flow, a portion of each of said filtering means fitting into one of said grooves; a pair of splines each fitting over one of said filtering means and into one of said grooves substantially tightly for substantially the total length of said grooves; a substantially U-shaped member disposed over said frame for substantially the total length of said grooves, with the legs thereof fitting over said filtering means, said supporting plates, said splines, and said laterally opposite faces; and means for releasably clamping said filtering means near said overlapping portions sufficiently to prevent free passage of solids into said interior space.

5. The filter plate defined in claim 4 wherein said means for releasably clamping comprises a pair of bars shaped to fit against the filtering means around the overlapping portions of said header and to be bolted in place to bind said filtering means against said frame; said bars and the ends of said U-shaped member being in substantially abutting relationship.

6. The filter plate defined in claim 4 wherein said frame has at least one bolt hole near said overlapping portions of said header, and said means for releasably clamping comprises a pair of bars disposed over laterally opposite faces of said frame over said filtering means, said bars being of a shape relative to said overlapping portions and said U-shaped member sufficient to prevent free passage of solids into said interior space when held tightly thereon, and at least one bolt passing through said bars and said bolt hole and binding said bars in place; said bars and the ends of said U-shaped member being in substantially abutting relationship.

7. A filter plate amenable to easy assembly and disassembly, said filter plate comprising a frame having at least one radial hole therein with a filtrate outlet means mounted on said frame over said hole, said outlet means comprising a header having portions overlapping laterally opposite faces of said frame and a nozzle on said header suitable for connection with an outlet manifold, said frame having a pair of grooves oppositely disposed in its laterally opposite faces and extending substantially from near one side of said overlapping portions of said header around said frame to near the other side of said overlapping portions, and said frame having a pair of recesses each disposed along an edge of the inner face of said frame; a pair of perforated supporting plates fitting in said pair of recesses; a pair of filtering means each disposed over one of said supporting plates and against one of said laterally opposite faces to effect an interior space into which filtrate can flow, a portion of each of said filtering means fitting into one of said grooves; a pair of splines each fitting over one of said filtering means and into one of said grooves substantially tightly for substantially the total length of said grooves; a substantially U-shaped member disposed over said frame for substantially the total length of said grooves, with the legs thereof fitting over said filtering means, said supporting plates, said splines, and said laterally opposite faces; and means for releasably clamping said filtering means near said overlapping portions sufficiently to prevent free passage of solids into said interior space; said nozzle having a substantially flat area near its open end and a flat gasket thereon for sealing engagement with an outlet manifold.

8. A filter plate comprising a frame having at least one radial hole therein; a filtrate outlet means mounted on said frame over said radial hole, said outlet means comprising a header having portions overlapping the laterally opposite faces of said frame and a nozzle associated with said header suitable for connection with a manifold; a pair of filtering means each disposed on said frame on the laterally opposite faces thereof to effect an interior space into which a filtrate can flow; means for releasably clamping said filtering means against the laterally opposite faces of said frame around said overlapping portions; and means for releasably holding said filtering means against said frame around the remainder thereof, wherein said frame has at least one bolt hole near said overlapping portions of said header, and said means for releasably clamping comprises a pair of bars disposed over laterally opposite faces of said frame over said filtering means; said bars being of a shape relative to said overlapping portions and said means for releasably holding sufficient to prevent free passage of solids into said interior space when held tightly thereon, and at least one bolt passing through said bars and said bolt hole and binding said bars in place.

References Cited

UNITED STATES PATENTS

| | | | |
|---|---|---|---|
| 1,601,947 | 10/1926 | Edmunds | 210—461 |
| 1,726,035 | 8/1929 | Loew | 210—486 |
| 1,812,725 | 6/1931 | Stanley et al. | 210—486 |
| 1,867,397 | 7/1932 | Brace et al. | 210—346 |
| 2,443,087 | 6/1948 | Ulrich | 210—486 |
| 2,909,285 | 10/1959 | Besler | 210—486 |

FOREIGN PATENTS 460,992  6/1928  Germany.

REUBEN FRIEDMAN, *Primary Examiner.*

F. SPEAR, *Assistant Examiner.*

UNITED STATES PATENT OFFICE
CERTIFICATE OF CORRECTION

Patent No. 3,339,742 September 5, 1967

Aloysius C. Kracklauer

It is hereby certified that error appears in the above numbered patent requiring correction and that the said Letters Patent should read as corrected below.

Column 4, lines 2 and 3, strike out "of any suitable material, even metal, although O-rings and the like may be employed in the construction." and insert the same after "made" in column 3, line 75.

Signed and sealed this 22nd day of October 1968.

(SEAL)
Attest:

Edward M. Fletcher, Jr.

Attesting Officer

EDWARD J. BRENNER

Commissioner of Patents